UNITED STATES PATENT OFFICE.

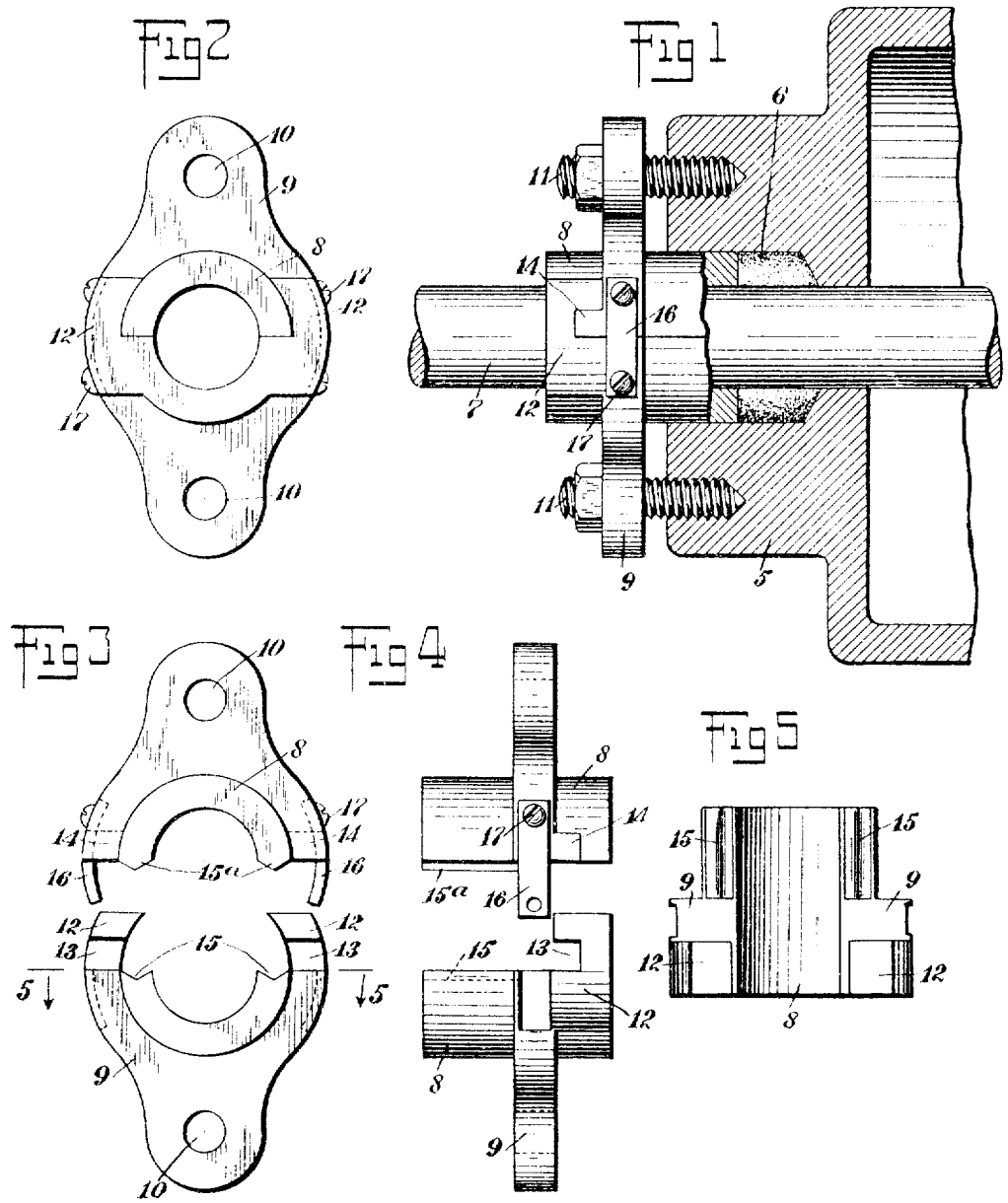

FREDERICK KEELER, OF WHITE PLAINS, NEW YORK.

STUFFING-BOX GLAND.

943,356.  Specification of Letters Patent.  Patented Dec. 14, 1909.

Application filed June 17, 1909. Serial No. 502,723.

*To all whom it may concern:*

Be it known that I, FREDERICK KEELER, a citizen of the United States, and a resident of White Plains, in the county of Westchester and State of New York, have invented a new and Improved Stuffing-Box Gland, of which the following is a full, clear, and exact description.

The invention belongs to that class of stuffing-box glands which are constructed of separable sections to enable the removal of the gland from the piston rod without the necessity of disconnecting the rod from the cross head.

The invention has in view a gland of this character in which the sections interlock with each other and are held against relative movement in any direction, the bolts or studs for forcing the gland into the stuffing-box also serving to force the inner end portions of the sections of the gland together.

Reference is to be had to the accompanying drawings forming a part of this specification, in which similar characters of reference indicate corresponding parts in all the views.

Figure 1 is a longitudinal section through a stuffing-box of a cylinder having my improved gland; Fig. 2 is an outer end view of the gland; Fig. 3 is an inner end view of the gland, with the sections thereof separated; Fig. 4 is a side view of the gland, with the sections separated; and Fig. 5 is an inner face view of one of the gland sections.

For the purpose of illustrating the nature and application of my improved stuffing-box, I have shown a cylinder 5 having the usual stuffing-box 6 through which the piston rod 7 passes.

My improved gland for compressing and holding the packing in the box is constructed with a body portion 8 having an internal bore of a size to snugly fit the piston rod 7 and an external diameter to likewise fit within the stuffing-box 6, the body having an intermediate flange 9 provided with the usual openings 10 to receive the studs or bolts 11 for forcing the gland into the box.

The body and flange of the gland are divided longitudinally into two separable half sections, the outer end portion of one of said sections having a lug or block 12 formed integrally or otherwise rigidly attached to its body or boss portion at each side, each lug extending beyond the inner edges of the gland sections, with the outer and inner faces arranged concentrically with respect to the body 8, as clearly shown in Figs. 2 and 3. The inner side edge of the extended portion of each lug is provided with a notch 13 which is designed to receive a similarly-shaped projection 14, integral or otherwise rigidly secured to the other gland section adjacent to the inner edges thereof, as shown in Figs. 1, 3 and 4. That portion of the body of the gland at the opposite side of the flange is provided on the inner edges of one gland section (shown to be that having the lugs 12) with V-shaped grooves 15; and the inner and abutting edges of the other gland section have counterpart tongues 15ᵃ, this construction of the joint between the gland sections obviously preventing the working of one gland section on the other when the two sections are secured together.

To secure the gland sections against relative longitudinal movement I provide straps 16, which are removably secured at each end to the flange 9 by screws or other suitable devices 17, the straps being arranged to overlie the joint at opposite sides of the gland sections, and preferably let into recesses formed in the flange, whereby the screws 17 will be relieved of strain and the straps prevented from working laterally.

With the several parts of the gland detached, the gland is applied by placing the two sections against the piston rod, with the section having the projection 14, arranged inwardly between the stuffing-box and the other gland section. One or both of the gland sections are then slid on the rod to carry the projection 14 into the notches 13 of the lugs, and both sections passed within the stuffing-box, with the studs passing through the openings 10 in the flange 9. The straps 16 are then applied and the nuts of the studs tightened to compress the packing in the box. The pressure on the flange incident to the tightening of the stud nuts forces the tongue and grooved portion of the joint between the gland sections securely together, the separation of the outer portions of the gland sections being resisted by the lugs 12 and projections 14, thus effectually preventing the gland sections from working on each other during the action of the piston rod.

Having thus described my invention, I claim as new and desire to secure by Letters Patent:

1. A gland divided longitudinally into separable sections, a lug rigid with one section of the gland and having a notch, and a projection carried by the other section of the gland and arranged to move into and out of said notch by a relative longitudinal movement between the gland sections.

2. A gland divided longitudinally into separable sections and provided with an intermediate flange, the gland sections at the inner side of the flange having a tongue and grooved joint, and means to prevent the lateral separation of the two sections of the gland, arranged at the outer side of the flange to be engaged by a relative longitudinal movement between the gland sections.

3. A gland divided longitudinally into separable sections and having an intermediate flange provided with recesses in the edges at each side, with the recesses extending over the joint between the two gland sections, and straps securing the gland sections together, detachably secured to the flange and fitting within said recesses.

4. A gland divided longitudinally into separable sections, lugs extended over the joint between the sections of the gland, with each lug rigid with one of the gland sections and provided with notches in its inner side edge, and projections adapted to pass into and out of the said notches and secure the sections of the gland against lateral separation, with each projection carried by the opposite gland section to that carrying its engaging lug.

5. A gland having a body portion provided with an intermediate flange, with the flange and body portion divided longitudinally into separable half sections, and notched lugs and projections, with a lug and a projection arranged at each side of the flange, each of said lugs being rigid with the body portion of one of the gland sections, each of said projections being rigid with the body portion of the opposite gland section and arranged to move into and out of the notches of the lugs by a relative longitudinal movement of the gland sections, and the body portion of the gland sections at the opposite and inner side of the flange having a tongue and grooved joint.

6. A gland divided longitudinally into separable half sections and provided with an intermediate flange, means at the outer side of the flange to secure the gland sections against lateral separation and arranged to move into and out of engagement by a relative longitudinal movement between the gland sections, and straps to secure the gland sections against relative longitudinal movement, detachably secured to the flange.

In testimony whereof I have signed my name to this specification in the presence of two subscribing witnesses.

FREDERICK KEELER.

Witnesses:
ESTHER NELSON,
WM. W. FORD.